United States Patent
Kim et al.

(10) Patent No.: US 11,587,729 B2
(45) Date of Patent: Feb. 21, 2023

(54) ELECTRONIC COMPONENT

(71) Applicant: SAMSUNG ELECTRO-MECHANICS CO., LTD., Suwon-si (KR)

(72) Inventors: Sang Yeop Kim, Suwon-si (KR); Beom Joon Cho, Suwon-si (KR); Gyeong Ju Song, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 0 days.

(21) Appl. No.: 17/469,164

(22) Filed: Sep. 8, 2021

(65) Prior Publication Data

US 2022/0181078 A1    Jun. 9, 2022

(30) Foreign Application Priority Data

Dec. 4, 2020    (KR) .................. 10-2020-0168125

(51) Int. Cl.
*H01G 2/06*    (2006.01)
*H01G 4/30*    (2006.01)
*H01G 4/232*    (2006.01)

(52) U.S. Cl.
CPC ............. *H01G 2/06* (2013.01); *H01G 4/2325* (2013.01); *H01G 4/30* (2013.01)

(58) Field of Classification Search
None
See application file for complete search history.

(56) References Cited

U.S. PATENT DOCUMENTS

| | | | |
|---|---|---|---|
| 10,796,853 B2* | 10/2020 | Cho | H01G 4/2325 |
| 2005/0041367 A1* | 2/2005 | Yoshii | H01G 4/228 |
| | | | 361/303 |
| 2009/0147440 A1 | 6/2009 | Cygan et al. | |
| 2016/0086730 A1* | 3/2016 | Park | H05K 3/3426 |
| | | | 361/306.3 |
| 2022/0076884 A1* | 3/2022 | Sim | H01G 4/248 |
| 2022/0181078 A1* | 6/2022 | Kim | H01G 4/30 |

FOREIGN PATENT DOCUMENTS

| | | | | |
|---|---|---|---|---|
| CN | 104937684 A | * | 9/2015 | ......... B23K 1/0016 |
| CN | 110997223 A | * | 4/2020 | ......... B22F 1/0074 |
| JP | 3883528 B2 | | 2/2007 | |
| JP | 2014-072373 A | | 4/2014 | |
| JP | 2020534675 A | * | 11/2020 | |
| KR | 2019116143 A | * | 10/2019 | ............ H01G 2/06 |
| KR | 20220033179 A | * | 3/2022 | |
| WO | WO-2018146990 A1 | * | 8/2018 | ............ H01F 27/29 |

* cited by examiner

*Primary Examiner* — Dion R. Ferguson
(74) *Attorney, Agent, or Firm* — Morgan, Lewis & Bockius LLP

(57) ABSTRACT

An electronic component includes a multilayer capacitor including a body and an external electrode disposed externally on the body; a metal frame coupled to the multilayer capacitor; and an adhesive layer disposed between the external electrode and the metal frame and including a solder layer and a conductive resin layer.

20 Claims, 7 Drawing Sheets

ELECTRONIC COMPONENT

CROSS-REFERENCE TO RELATED APPLICATION(S)

This application claims the benefit of priority to Korean Patent Application No. 10-2020-0168125, filed on Dec. 4, 2020 in the Korean Intellectual Property Office, the disclosure of which is incorporated herein by reference in its entirety.

TECHNICAL FIELD

The present disclosure relates to an electronic component.

BACKGROUND

A multilayer capacitor has been used in various electronic devices as a multilayer capacitor has a small size and may be implemented with high capacity.

Recently, with the rapid development of eco-friendly vehicles and electrical vehicles, vehicles may have an increasing number of power driving systems, and demand for a multilayer capacitor required for vehicles has also increased.

To be used as a component for a vehicle, a high level of thermal reliability, electrical reliability, and mechanical reliability may be required. Accordingly, performance required for a multilayer capacitor has increased, and a structure of a multilayer capacitor having strong resistance against vibrations and deformation may be necessary.

As a method for improving durability against vibrations and deformation, an electronic component having a structure in which a multilayer capacitor is mounted at a predetermined distance from a board using a metal frame has been used.

However, in an electronic component using a general metal frame, as a height of being spaced apart from a board has been increased to improve durability such as warpage strength, equivalent series inductance (ESR) may increase. Also, the increase in thickness of a multilayer capacitor increases may not be suitable for the trend of miniaturization of chips.

Thus, it may be necessary to devise a technique for an electronic component which may improve durability such as warpage strength by maintaining a mounting height of the electronic component using a metal frame to be low and also effectively reducing stress transmitted from a mounting board to a multilayer capacitor.

SUMMARY

An aspect of the present disclosure is to provide an electronic component which may maintain a low mounting height of the electronic component using a metal frame and may improve durability such as warpage strength.

According to an aspect of the present disclosure, an electronic component includes a multilayer capacitor including a body and an external electrode disposed externally on the body; a metal frame bonded to the multilayer capacitor; and an adhesive layer disposed between the external electrode and the metal frame and including a solder layer and a conductive resin layer.

According to another aspect of the present disclosure, an electronic component includes a multilayer capacitor including a body and first and second external electrodes disposed externally on the body and spaced apart from each other; first and second metal frames coupled to the first and second external electrodes of the multilayer capacitor, respectively; a first adhesive layer disposed between the first external electrode and the first metal frame and including a first solder layer and a first conductive resin layer; and a second adhesive layer disposed between the second external electrode and the second metal frame and including a second solder layer and a second conductive resin layer.

According to still another aspect of the present disclosure, an electronic component includes a multilayer capacitor including a body and an external electrode disposed externally on the body; a metal frame bonded to the multilayer capacitor; and an adhesive layer disposed between the external electrode and the metal frame and including a conductive resin layer. A length of the conductive resin layer is less than a length of the adhesive layer.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
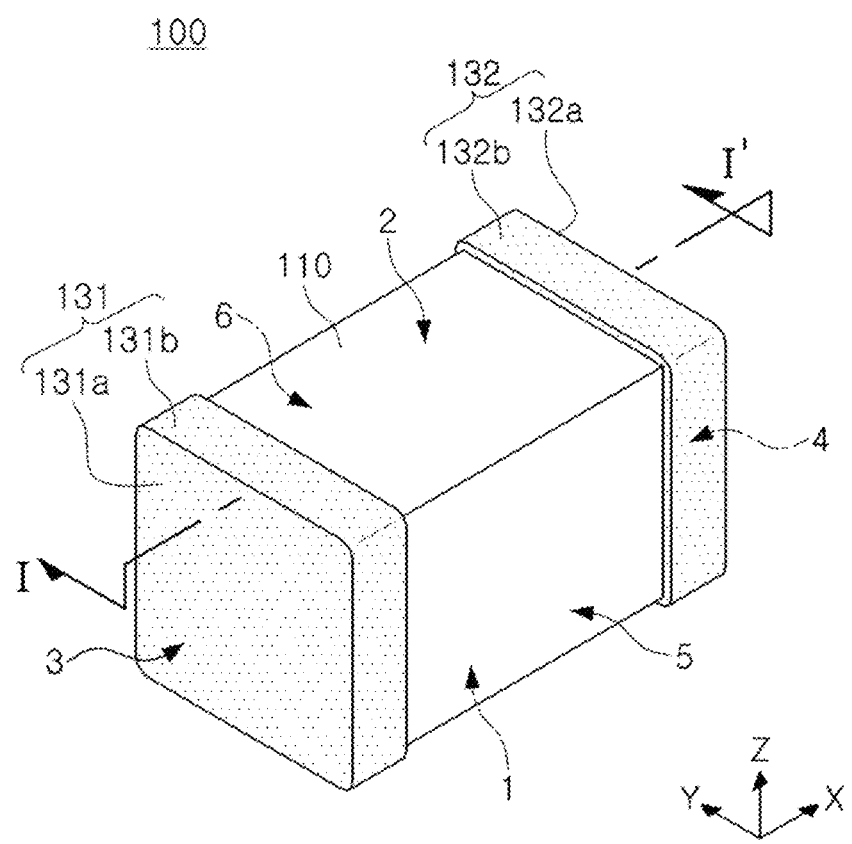
FIG. 1 is a perspective diagram illustrating a multilayer capacitor according to an example embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Shapes and sizes of elements in the drawings may be exaggerated for clarity of description, and elements indicated by the same reference numeral are same elements in the drawings.

Also, it will be understood that when a portion "includes" an element, it may further include another element, not excluding another element, unless otherwise indicated.

As for the directions to clearly describe an example embodiment, X, Y, and Z in the drawings represent a length direction, a width direction, and a thickness direction of a multilayer capacitor, respectively.

Also, in example embodiments, a length direction may be an X direction or a first direction, a width direction may be a Y direction or a second direction, and the thickness direction may be a Z direction, a third direction, or a stacking direction.

Electronic Component

Figure 2A:
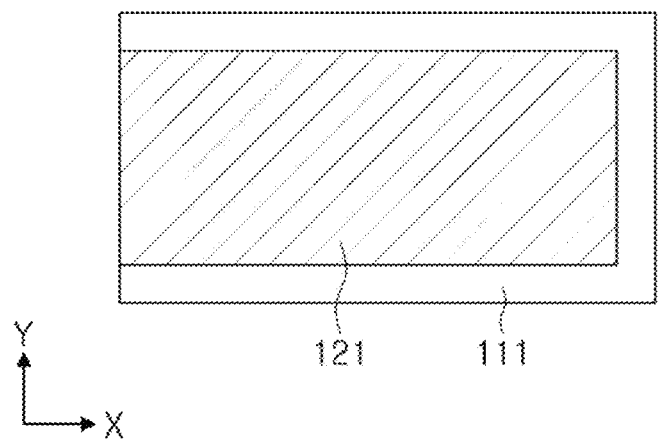
FIGS. 2A and 2B are plan diagrams illustrating each of first and second internal electrodes included in a multilayer capacitor.
Figure 2B:
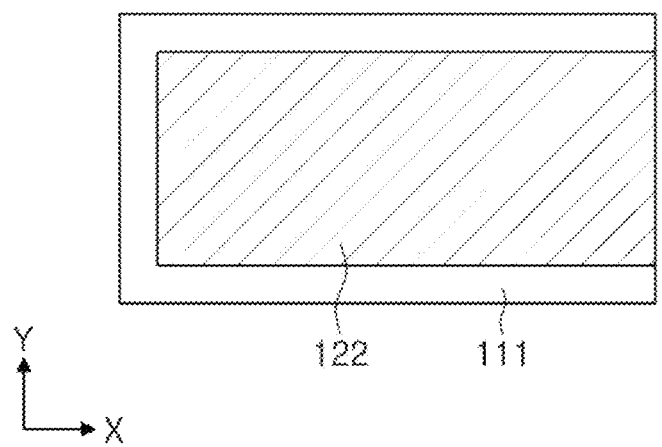
Figure 3:
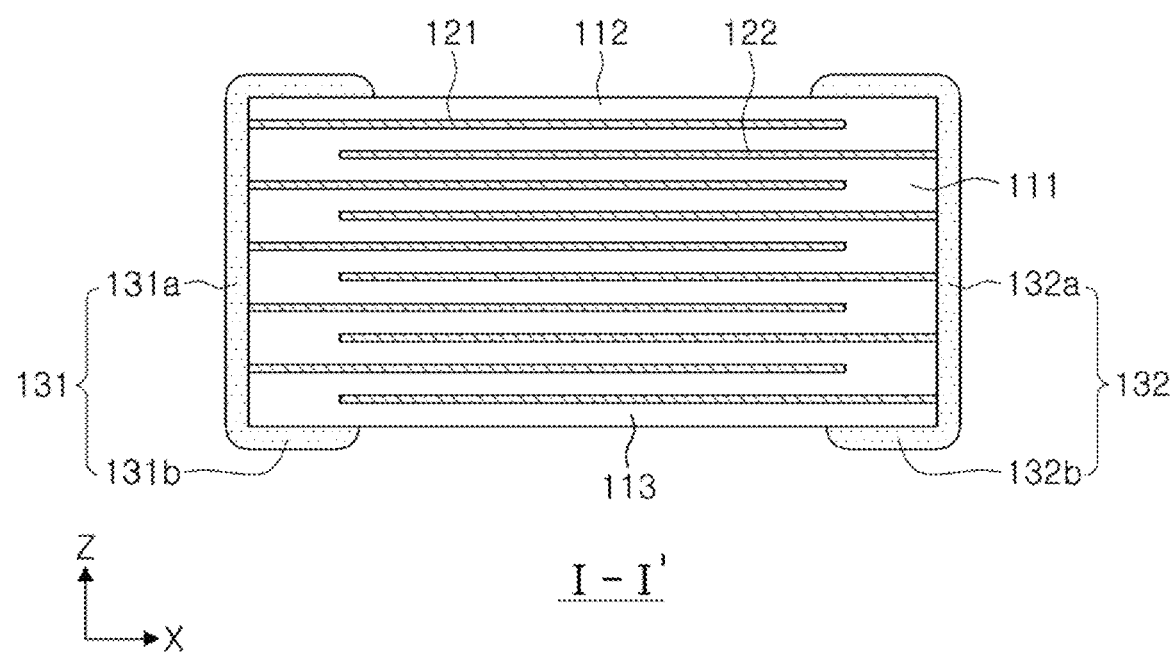
FIG. 3 is a cross-sectional diagram taken along line I-I' in FIG. 1.

FIG. 1 is a perspective diagram illustrating a multilayer capacitor according to an example embodiment. FIGS. 2A and 2B are plan diagrams illustrating each of first and second internal electrodes included in a multilayer capacitor. FIG. 3 is a cross-sectional diagram taken along line I-I' in FIG. 1.

In the description below, a structure of a multilayer capacitor 100 applied to an electronic component according to an example embodiment will be described with reference to FIGS. 1 to 3.

The multilayer capacitor 100 in the example embodiment may include a body 110 and external electrodes 131 and 132 disposed externally on the body 110.

The body 110 may be formed by alternately laminating the plurality of dielectric layers 111 in the Z direction. Boundaries between the dielectric layers 111 adjacent to each other may be integrated such that it may be difficult to identify the boundaries without using a scanning electron microscope (SEM).

The body 110 may include a plurality of dielectric layers 111 and internal electrodes 121 and 122 stacked with the dielectric layers 111 interposed therebetween.

The body 110 may include an active region contributing to the formation of a capacitance of the capacitor, and cover regions 112 and 113 arranged above and below the active region in the Z direction as margin portions.

A shape of the body 110 is not limited to any particular shape, and may a hexahedral shape. The body 110 may include first and second surfaces 1 and 2 opposing each other in the Z direction, third and fourth surfaces 3 and 4 connected to the first and second surfaces 1 and 2 and opposing each other in the X direction, and fifth and sixth surfaces 5 and 6 connected to the first to fourth surfaces 1, 2, 3, and 4 and opposing each other in the Y direction.

The dielectric layer 111 may include ceramic powder, $BaTiO_3$ ceramic powder, for example.

The $BaTiO_3$ ceramic powder may be $(Ba_{1-x}Ca_x) TiO_3$, $Ba(Ti_{1-y}Ca_y)O_3$, $(Ba_{1-x}Ca_x) (Ti_{1-y}Zr_y)O_3$ or $Ba (Ti_{1-y}Zr_y)O_3$ in which Ca or Zr is partially solid-solute in $BaTiO_3$, but an example embodiment thereof is not limited thereto.

The dielectric layers 111 may further include ceramic additives, organic solvents, plasticizers, binders, and dispersants in addition to the ceramic powder.

The ceramic additive may include, for example, a transition metal oxide or a transition metal carbide, a rare earth element, magnesium (Mg) or aluminum (Al).

The internal electrodes 121 and 122 may include a first internal electrode 121 and a second internal electrode 122 having different polarities. The first and second internal electrodes 121 and 122 may be formed on the dielectric layer 111 and may be stacked in the Z direction, and may be alternately disposed in the body 110 with the dielectric layer 111 interposed therebetween in the Z direction to oppose each other.

In this case, the first and second internal electrodes 121 and 122 may be electrically insulated from each other by the dielectric layer 111 disposed therebetween.

In the example embodiment, the structure in which the internal electrodes are stacked in the Z direction is illustrated, but an example embodiment thereof is not limited thereto. The example embodiment may also be applied to a structure in which the internal electrodes are stacked in the Y direction if desired.

One ends of the first and second internal electrodes 121 and 122 may be exposed through the third and fourth surfaces 3 and 4 of the body 110, respectively.

The ends of the first and second internal electrodes 121 and 122 alternately exposed through the third and fourth surfaces 3 and 4 of the body 110 may be electrically connected to the first and second external electrodes 131 and 132 disposed on both ends of the body 110 in the X direction.

Accordingly, when a predetermined voltage is applied to the external electrodes 131 and 132, electric charges may be accumulated between the first and second internal electrodes 121 and 122.

In this case, capacitance of the multilayer capacitor 100 may be proportional to an area of overlap between the first and second internal electrodes 121 and 122 overlapping each other in the Z direction in the active region.

A material for forming the internal electrodes 121 and 122 is not limited to any particular material, and may be formed using a conductive paste formed of at least one of a noble metal material or nickel (Ni) and copper (Cu).

As a method of printing the conductive paste, a screen printing method or a gravure printing method may be used, and an example embodiment thereof is not limited thereto.

The external electrodes 131 and 132 may include a first external electrode 131 and a second external electrode 132 disposed on both end surfaces of the body 110 in the X direction, respectively. The first and second external electrodes 131 and 132 may be provided with voltages of different polarities, and may be electrically connected to the exposed ends of the first and second internal electrodes 121 and 122, respectively.

The first external electrode 131 may include a first head portion 131a and a first band portion 131b.

The first head 131a may be disposed on the third surface 3 of the body 110 and may be in contact with the end of the first internal electrode 121 exposed through the third surface 3 of the body 110. The first head 131a may electrically connect the first internal electrode 121 to the first external electrode 131.

The first band portion 131b may extend from the first head portion 131a to a portion of the first, second, fifth and sixth surfaces 1, 2, 5, and 6 of the body 110 to improve adhesion strength.

The second external electrode 132 may include a second head portion 132a and a second band portion 132b.

The second head 132a may be disposed on the fourth surface 4 of the body 110 and may be in contact with the end of the second internal electrode 122 exposed through the fourth surface 4 of the body 110. The second head 132a may electrically connect the second internal electrode 122 to the second external electrode 132.

The second band portion 132b may extend to a portion of the first, second, fifth and sixth surfaces 1, 2, 5, and 6 of the body 110 in the second head portion 132a to improve the adhesion strength In the example embodiment, the external electrodes 131 and 132 may be formed of a sintered electrode including at least one metal component selected from among copper (Cu), nickel (Ni), and the like.

Also, at least one plating layer may be additionally formed on a surface of the external electrodes 131 and 132. In this case, the plating layer may include a nickel (Ni)

plating layer covering the surfaces of the external electrodes 131 and 132 and a tin (Sn) plating layer covering the nickel plating layer.

Figure 4:
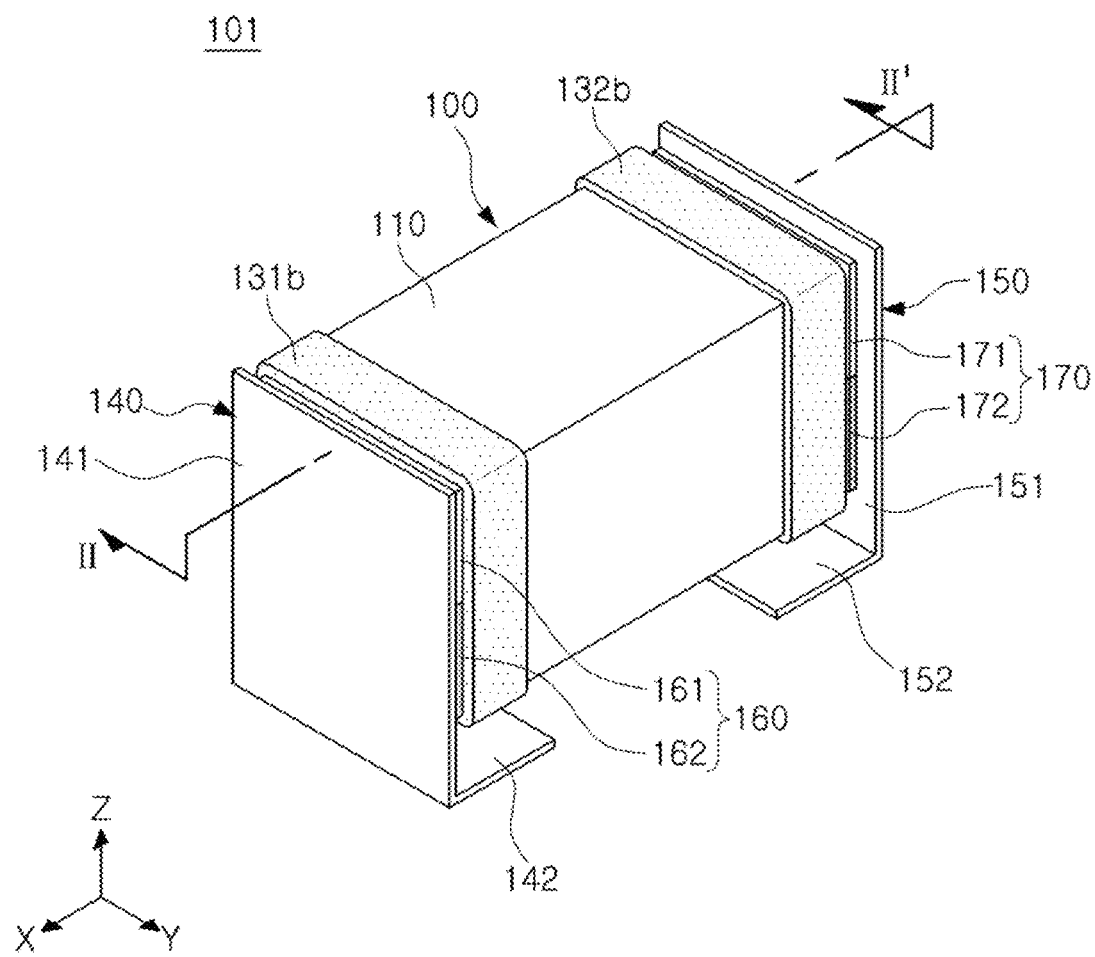
FIG. 4 is a perspective diagram illustrating an electronic component in which a metal frame is bonded to a multilayer capacitor in FIG. 1.
Figure 5:
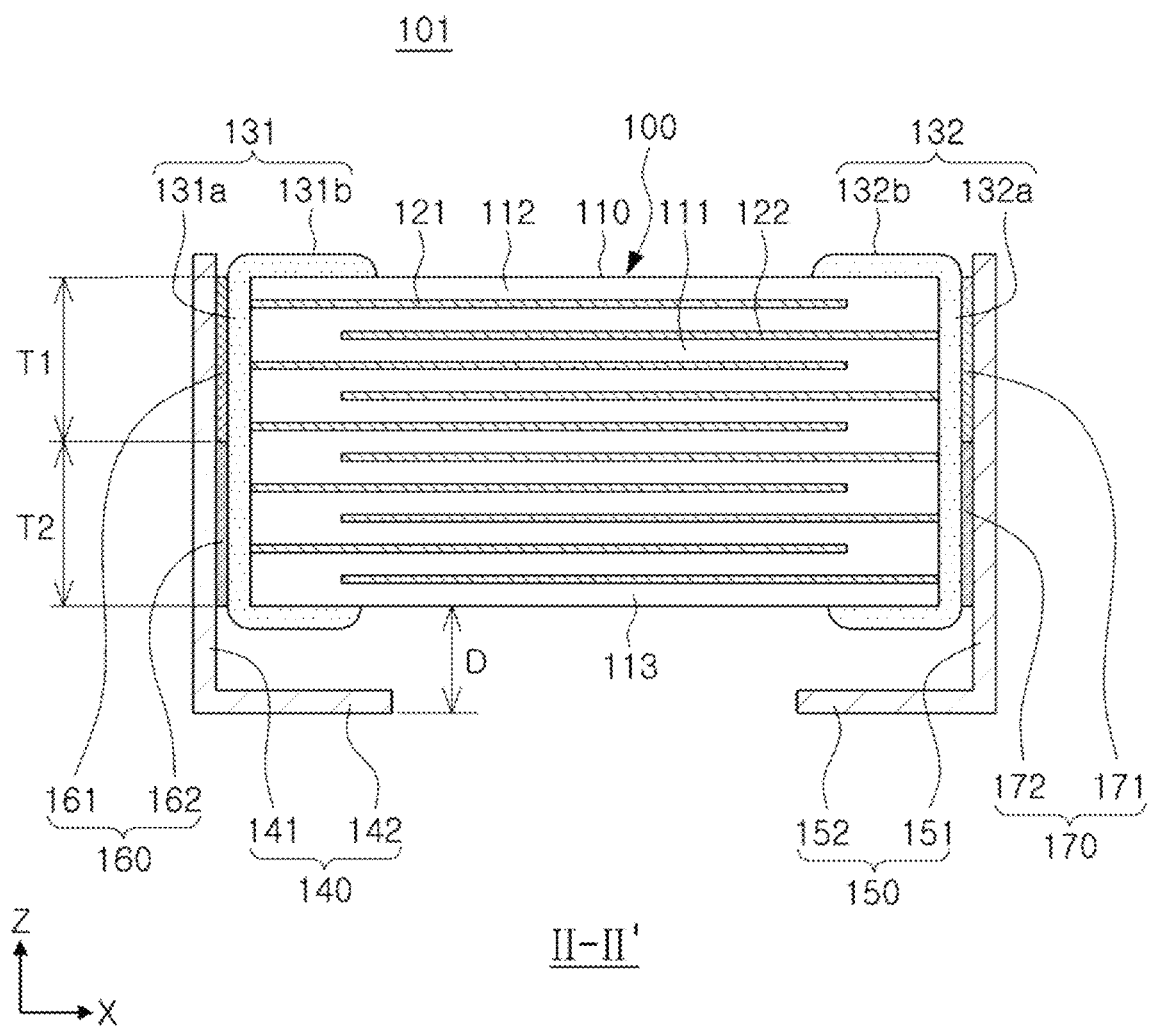
FIG. 5 is a cross-sectional diagram taken along line II-II' in FIG. 4.

FIG. 4 is a perspective diagram illustrating an electronic component in which a metal frame is bonded to a multilayer capacitor in FIG. 1. FIG. 5 is a cross-sectional diagram taken along line II-II' in FIG. 4.

Referring to FIGS. 4 and 5, the electronic component 101 in the example embodiment may include a multilayer capacitor 100, metal frames 140 and 150 bonded to the multilayer capacitor 100, and adhesive layers 160 and 170 disposed between the external electrodes 131 and 132 and the metal frame 140 and 150.

The metal frames 140 and 150 may include support portions 141 and 151 bonded to the external electrodes 131 and 132 and extending to one direction in the stacking direction (Z direction) of the internal electrodes 121 and 122, and mounting portions 142 and 152 extending in the first direction (X direction) to oppose one surface of the body 110 on one ends of the extended support portions 141 and 151.

The support portions 141 and 151 may be formed perpendicular to the mounting surface, and may be bonded to and electrically and physically connected to the first and second head portions 131a and 132a of the first and second external electrodes 131 and 132, respectively. As an example, referring to FIGS. 4 to 5, the support portions 141 and 151 may include a region bonded to the head portions 131a and 132a of the external electrodes 131 and 132, and a region extending to one direction in the Z direction and connected to the mounting portions 142 and 152.

A shape of the support portions 141 and 151 is not limited to any particular shape, and may have a rectangular shape protruding further than the head portions 131a and 132a to one direction in the Z direction as illustrated in the diagram.

Also, a length of the support portions 141 and 151 in the Y direction is not limited to any particular example, and may be configured to be similar to the length of the head portions 131a and 132a in the Y direction as illustrated in the diagram. When the area of the support portions 141 and 151 is excessively large, the configuration may not suitable for the trend of miniaturization of electronic components, whereas when the area of the support portions 141 and 151 is excessively small, adhesion with the external electrodes 131 and 132 and durability during mounting may be insufficient.

The mounting portions 142 and 152 may extend in the X direction to oppose the first surface 1 of the body 110 on one ends of the support portions 141 and 151. The mounting portions 142 and 152 may be formed horizontally with respect to the mounting surface, and may work as connection terminals when being mounted on a board.

As an example, as illustrated in FIGS. 4 and 5, the mounting portions 142 and 152 may extend towards the second head portion 132a and the first head portion 131a in the first direction (X direction). In this case, the mounting portions 142 and 152 may be disposed to be spaced apart from the band portions 131b and 132b of the external electrodes 131 and 132 and the first surface 1 of the body 110.

A length in which the mounting portions 142 and 152 extend in the X direction is not limited to any particular example. For example, as illustrated in FIG. 5, the length may be configured to be longer than the area of the band portions 131b and 132b formed on the first surface 1 of the body 110. However, an example embodiment thereof is not limited thereto, and the length may be varied within a range in which the mounting portions 142 and 152 extending in the first direction are spaced apart from each other.

The metal frames 140 and 150 may include a first metal frame 140 bonded to the first external electrode 131 of the multilayer capacitor 100 and a second metal frame 150 bonded to the second external electrode 132.

The first metal frame 140 may include a first support portion 141 bonded to the first head portion 131a of the first external electrode 131 and a first mounting portion 142 extending from one end of the first support portion 141 in the first direction toward the second head portion 132a.

The second metal frame 150 may include a second support portion 151 bonded to the second head portion 132a of the second external electrode 132, and a second mounting portion 152 extending from one end of the second support portion 151 in the first direction toward the first head portion 131a.

Adhesive layers 160 and 170 may be disposed between the external electrodes 131 and 132 and the support portions 141 and 151 of the metal frames 140 and 150, and the adhesive layers 160 and 170 may include solder layers 161 and 171 and conductive resin layers 162 and 172.

The adhesive layers 160 and 170 may bond and fasten the external electrodes 131 and 132 to the metal frames 140 and 150. Also, when the electronic component 101 is mounted on a printed circuit board, the adhesive layers 160 and 170 may electrically connect the external electrodes 131 and 132 to electrode pads of the printed circuit board.

The adhesive layers 160 and 170 may include a first adhesive layer 160 for bonding the first external electrode 131 to the first metal frame 140, and a second adhesive layer 170 for bonding the second external electrode 132 to the second metal frame 150. Accordingly, the first and second adhesive layers 160 and 170 may exhibit the same polarities as those of the first and second external electrodes 131 and 132, respectively.

The first adhesive layer 160 may include a first solder layer 161 and a first conductive resin layer 162, and the second adhesive layer 170 may include a second solder layer 162 and a second conductive resin layer 172.

In the case of an electronic component including a general metal frame, only solder may be used as a member for bonding the external electrode to the metal frame, which may exhibit limitations in terms of durability and ESR of the electronic component.

In other words, in the case in which the external electrode is bonded to the metal frame using only solder, when the electronic component is mounted on the board, external forces such as vibration transmitted from a board to the metal frame may not be absorbed by the solder, such that the external forces may be transmitted to the multilayer capacitor. Accordingly, durability such as warpage strength of the multilayer capacitor may be deteriorated, and the external electrode may be separated from the metal frame due to the external forces.

To compensate for the durability, generally, a leg length (mounting height) of the metal frame may be increased to effectively absorb external forces such as vibration. However, in this case, an area occupied by the electronic component may increase when the electronic component is mounted, which may not be suitable for the trend of miniaturization, and as the mounting height increases, ESR may also increase.

In the electronic component 101 in an example embodiment, the adhesive layers 160 and 170 may be formed such that the solder layers 161 and 171 and the conductive resin layers 162 and 172 may be disposed together. Accordingly, the mounting height of the electronic component 101 may be maintained to be low, and durability such as warpage strength may improve.

Specifically, by disposing the conductive resin layers 162 and 172 having elasticity greater than that of solder below the solder layers 161 and 171, external forces such as vibration transmitted from the board to the multilayer capacitor 100 may be absorbed by the adhesive layer 160 and 170 and may be reduced. Accordingly, it may not be necessary to excessively increase a spacing distance (mounting height) between the mounting portions 142 and 152 of the metal frames 140 and 150 and the body 110, such that durability such as warpage strength may improve and ESR may be maintained to be low.

Further, in the example embodiment, the conductive resin layers 162 and 172 may be disposed to be more adjacent to the mounting portions 142 and 152 than the solder layers 161 and 171. Among bonding interfacial surfaces between the head portions 131a and 132a and the support portions 141 and 151, the conductive resin layers 162 and 172 may be disposed in a lower region more adjacent to the mounting surface of the electronic component 101, and the solder layers 161 and 171 may be disposed in an upper region spaced apart from the mounting surface of the electronic component 101.

Accordingly, the solder layers 161 and 171 may bond and fasten the external electrodes 131 and 132 and the metal frames 140 and 150 in the upper region of the bonding interface, such that the solder layers 161 and 171 may maintain the bonding structure against external forces such as vibrations or impacts.

Also, the conductive resin layer 162 and 172 may be disposed in the lower region of the bonding interfacial surface between the external electrodes 131 and 132 and the metal frame 140 and 150, the region which firstly receives vibrations or the like, such that the conductive resin layer 162 and 172 may partially absorb the vibrations by elasticity and flexibility, and may reduce vibrations transmitted to the solder layers 161 and 171 and the body 110.

Referring to FIGS. 4 and 5, one ends of the solder layers 161 and 171 may be bonded to one ends of the conductive resin layer 162 and 172, respectively. In other words, lower ends of the first and second solder layers 161 and 171 and upper ends of the first and second conductive resin layers 162 and 172 may be bonded to each other, respectively, and may form the first and second adhesive layers 160 and 170 as a whole.

As described above, when the solder layers 161 and 171 and the conductive resin layers 162 and 172 are bonded to each other, the adhesive layers 160 and 170 may be formed without an empty space with respect to the entire region of the head portions 131a and 132a of the external electrodes 131 and 132, such that bonding force between the metal frames 140 and 150 and the external electrodes 131 and 132 may improve.

Also, the solder layers 161 and 171 and the conductive resin layers 162 and 172 may be disposed to not overlap each other in the first direction (X direction). In other words, in a space between the external electrodes 131 and 132 and the metal frames 140 and 150, the two layers may be bonded and disposed side by side without overlapping each other.

As described above, when the solder layers 161 and 171 and the conductive resin layers 162 and 172 are disposed to not overlap each other, the possibility that the solder layers 161 and 171 and the conductive resin layers 162 and 172 having different physical properties are diffused and react with each other in the manufacturing process may decrease. Also, a decrease in bonding force caused by repulsive force between different materials may be prevented.

The solder layers 161 and 171 and the conductive resin layers 162 and 172 may be configured to have the same length in the first direction (X direction) in the space between the external electrodes 131 and 132 and the metal frames 140 and 150. In other words, thicknesses of the coating on the surfaces of the head portions 131a and 132a may be the same.

In this case, with respect to the entire region of the head portions 131a and 132a on which the solder layers 161 and 171 and the conductive resin layers 162 and 172 are disposed, the spacing distances between the external electrodes 131 and 132 and the metal frame 140 and 150 may be maintained to be the same.

Also, the solder layers 161 and 171 and the conductive resin layers 162 and 172 may be configured to have the same length in the second direction (Y direction) in the space between the external electrodes 131 and 132 and the metal frames 140 and 150. In other words, widths of the coating on the surfaces of the head portions 131a and 132a in the Y direction may be the same.

In this case, with respect to the entire region of the head portions 131a and 132a on which the solder layers 161 and 171 and the conductive resin layers 162 and 172 are disposed, the adhesive layers 140 and 150 may be arranged without forming an empty space between the external electrodes 131 and 132 and the metal frames 140 and 150.

Also, in the example embodiment, when the solder layers 161 and 171 and the conductive resin layers 162 and 172 are configured to have the same length in the first and second directions, a volume ratio between the solder layers 161 and 171 and the conductive resin layers 162 and 172 may be the same as a length ratio in the stacking direction (Z direction).

Therefore, the example embodiment of the length ratio of the solder layers 161 and 171 and the conductive resin layers 162 and 172 in the stacking direction may also be applied to the volume ratio (content ratio) of the solder layers 161 and 171 and the conductive resin layers 162 and 172.

The solder layers 161 and 171 may include solders formed of various materials, and may be formed of components such as low-ductility lead (Pb) or no-ductility lead (Pb) and tin (Sn). The molten solder may be applied to regions between the external electrodes 131 and 132 and the metal frames 140 and 150, and may be cured, thereby forming the solder layers 161 and 171.

The solder layers 161 and 171 may be disposed in an upper portion spaced apart from the mounting surface in the head portions 131a and 132a, such that upper regions of the bonding interfacial surfaces between the external electrodes 131 and 132 and the metal frames 140 and 150 may be bonded and fastened to each other. Also, since components such as Pb and Sn have conductivity, the external electrodes 131 and 132 and the metal frames 140 and 150 may be electrically connected to each other.

The conductive resin layers 162 and 172 may include a conductivity imparting agent and resin.

The conductivity imparting agent may include at least one selected from among a conductive metal, a conductive polymer, and carbon.

The conductive metal is not limited to any particular material, and may include one or more selected from a group consisting of Ni (nickel), Cu (copper), and alloys thereof, for example. Carbon may include components such as graphite, CNT, and graphene.

The above-described conductivity imparting agent is merely an example, and any material having conductivity which may allow the external electrodes 131 and 132 and the metal frames 140 and 150 to be electrically connected to each other may be used.

The resin included in the conductive resin layers 162 and 172 may include a thermosetting resin, and may correspond to, for example, epoxy. Also, the epoxy may be a bisphenol-A (BPA) epoxy, a novolac epoxy, or the like.

The conductive resin layers 162 and 172 may be disposed in the lower portion adjacent to the mounting surface in the head portions 131a and 132a, such that elasticity and flexibility of the lower region of the bonding interface between the external electrodes 131 and 132 and the metal frames 140 and 150 may improve. In other words, when the electronic component 101 is mounted on a printed circuit board, the conductive resin layers 162 and 172 may partially absorb external forces such as vibrations or impacts transmitted from the printed circuit board, such that external stress transmitted to the body 110 may be reduced.

Also, since the conductive resin layers 162 and 172 include a conductivity imparting agent, the external electrodes 131 and 132 and the metal frames 140 and 150 may be electrically connected to each other. Accordingly, the entire bonding layers 160 and 170 including the solder layers 161 and 171 and the conductive resin layers 162 and 172 may work as a conductive bonding material.

Experimental Example

Figure 6A:
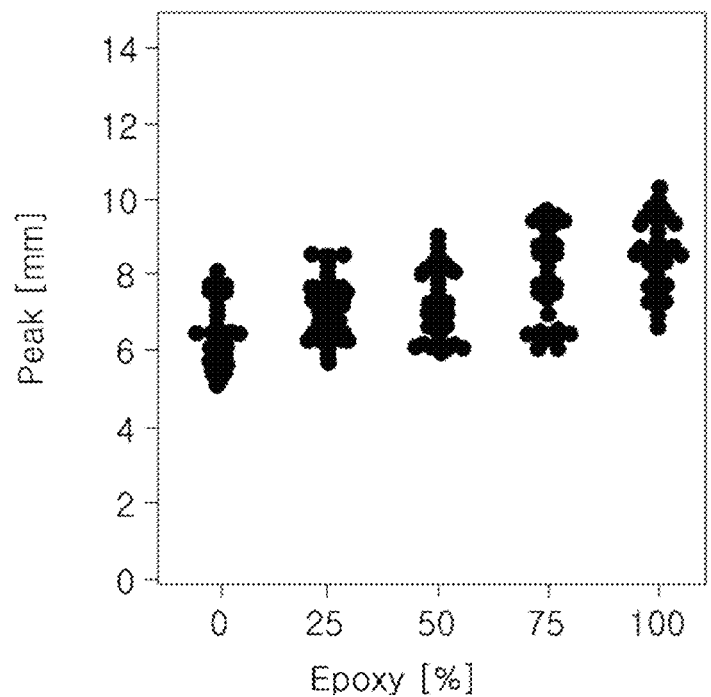
FIGS. 6A and 6B are graphs illustrating changes in warpage strength properties by varying a ratio between a solder layer and a conductive resin layer (epoxy) included in an electronic component.
Figure 6B:
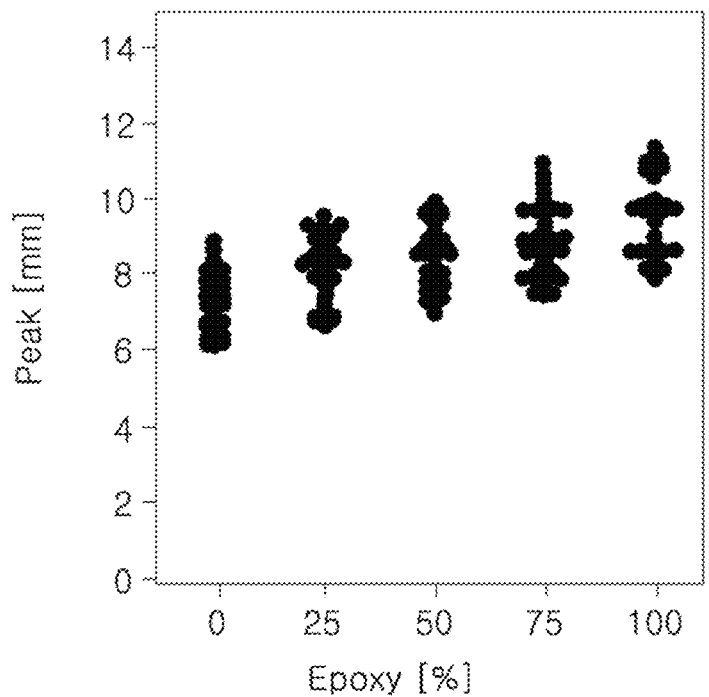
Figure 7A:
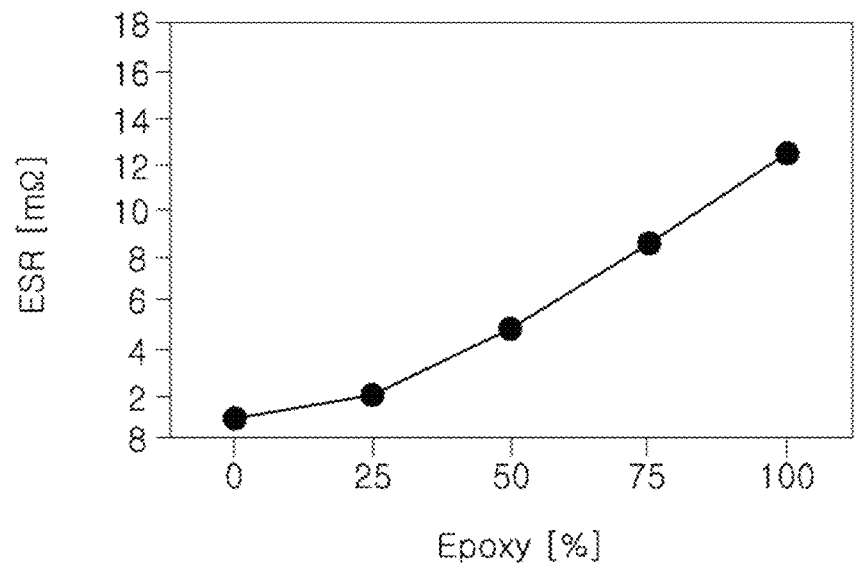
FIGS. 7A and 7B are graphs illustrating changes in ESR properties by varying a ratio between a solder layer and a conductive resin layer (epoxy) included in an electronic component.
Figure 7B:
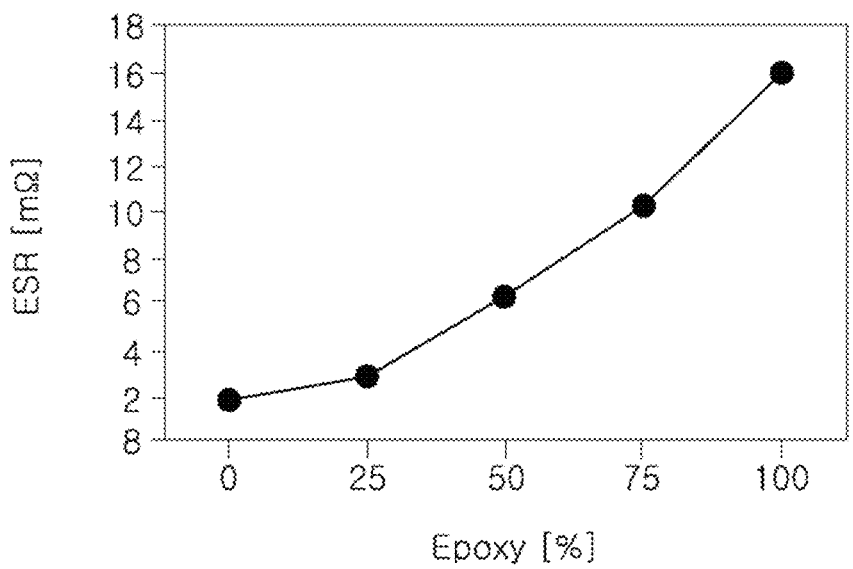

FIGS. 6A and 6B are graphs illustrating changes in warpage strength properties by varying a ratio between a solder layer and a conductive resin layer (epoxy) included in an electronic component. FIGS. 7A and 7B are graphs illustrating changes in ESR properties by varying a ratio between a solder layer and a conductive resin layer (epoxy) included in an electronic component.

In FIGS. 6 to 7, an experiment was performed by specifying the resin included in the conductive resin layers 162 and 172 as epoxy. Also, a ratio of epoxy illustrated in each graph indicates a ratio of a volume (content) of the conductive resin layers 162 and 172 to a total volume (content) of the solder layers 161 and 162 and the conductive resin layers 162 and 172.

In the example embodiment, lengths of the solder layers 161 and 162 and the conductive resin layers 162 and 172 in the X and Y directions were configured to be the same, and accordingly, the ratio of epoxy illustrated in each graph may indicate a ratio of a length (T2) of the conductive resin layers 162 and 172 to a total length (T1+T2) of the adhesive layers 160 and 170 illustrated in FIG. 5 in the stacking direction (Z direction), which may be T2/(T1+T2)*100.

Referring to FIGS. 6A and 6B, it is indicated that, as the ratio of the conductive resin layer including epoxy increased, warpage strength increased.

As for warpage strength of the electronic component, 30 sample chips were prepared for each test number (epoxy ratio of 0, 25, 50, 75 and 100%), a sample chip (MLCC) was mounted on the board (PCB), and a maximum length at which a crack occurs in the body while an opposite surface of the sample chip (MLCC) was pressed was represented by a peak value.

FIG. 6A is a graph illustrating a result value of when a vertical distance D between the mounting surface of the mounting portion 142 and 152 illustrated in FIG. 5 and the first surface 1 of the body 110 was 0.5 mm. FIG. 6B is a graph illustrating a result value of when the vertical distance D between the mounting surface of the mounting portion 142 and 152 illustrated in FIG. 5 and the first surface 1 of the body 110 was 1 mm.

Referring to FIGS. 6A and 6B, as compared to an adhesive layer including only a solder layer (epoxy ratio of 0%), a peak value of warpage strength was high in the adhesive layer (epoxy ratio of 25, 50, 75, and 100%) including both the solder layer and the conductive resin layer. In other words, in the experimental example, when the adhesive layer includes 25% or more of the conductive resin layer, warpage strength of the electronic component improved.

Also, referring to FIGS. 6A and 6B, as the ratio of the conductive resin layer containing epoxy increased, the peak value of warpage strength increased. In other words, it is indicated that, as the ratio of the conductive resin layer increased between the adhesive layers (epoxy ratio of 25, 50, 75, and 100%) including both the solder layer and the conductive resin layer, warpage strength of the electronic component was high.

A generally required guaranteeing peak value for warpage strength of an MLCC in the related technical field may be about 6 mm. Therefore, as illustrated in FIG. 6A, when the vertical distance D between the mounting surfaces of the mounting portions 142 and 152 and the first surface 1 of the body 110 is 0.5 mm, and the ratio of the conductive resin layer is 25% or more, warpage strength of the electronic component may almost satisfy the guaranteeing peak value.

In other words, when the adhesive layer is formed by configuring the solder layer and the conductive resin layer in a ratio of 75:25, as illustrated in FIG. 6B, an effect of improve warpage strength similar to the example in which the vertical distance D between the mounting surfaces of the mounting portions 142 and 152 and the first surface 1 of the body 110 is 1 mm and the adhesive layer which does not include the adhesive layer is formed may be obtained.

According to an example embodiment, by disposing both the solder layers 161 and 171 and the conductive resin layers 162 and 172 between the external electrodes 131 and 132 and the metal frames 140 and 150, durability such as warpage strength may improve while the mounting height of the electronic component 101 is maintained to be low.

Also, in the electronic component 101 in an example embodiment, when a length of the solder layers 161 and 171 in the stacking direction (Z direction) of the internal electrodes 121 and 122 is defined as T1, and a length of the conductive resin layers 162 and 172 is defined as T2, T1 and T2 may satisfy $0.25 \leq T2/(T1+T2) < 1$.

By limiting the length ratio (volume ratio) in the stacking direction of the solder layers 161 and 171 and the conductive resin layers 162 and 172 as above, warpage strength of the electronic component 101 may improve to be higher than a generally required guaranteeing peak for warpage strength of an MLCC.

In comparison between FIGS. 6A and 6B, overall warpage strength was high when vertical distance (D) between the mounting surface of the mounting portion 142 and 152 and the first surface 1 of the body 110 was 1 mm, rather than 0.5 mm, which may indicate that, as the mounting height increases by elongating the leg length of the metal frame, durability such as warpage strength of the electronic component may improve.

However, when the mounting height of the electronic component is increased to improve durability as above, ESR of the electronic component may also increase as illustrated in FIGS. 7A and 7B.

Referring to FIGS. 7A and 7B, it is indicated that ESR of the electronic component may increase as the ratio of the conductive resin layer including epoxy increases.

An ESR measurement value of each electronic component was obtained by a generally used method in the technical field, and may be a result of measurement using an LCR meter.

FIG. 7A is a graph illustrating a result value of when the vertical distance (D) between the mounting surface of the mounting portion 142 and 152 illustrated in FIG. 5 and the first surface 1 of the body 110 was 0.5 mm. FIG. 6B is a graph illustrating a result value of when the vertical distance D between the mounting surface of the mounting portions 142 and 152 and the first surface 1 of the body 110 was 1 mm.

In comparison between FIGS. 7A and 7B, overall ESR was high when vertical distance (D) between the mounting surface of the mounting portion 142 and 152 and the first surface 1 of the body 110 was 1 mm, rather than 0.5 mm, which may indicate that, as the mounting height increases by elongating the leg length of the metal frame, there may be a limitation in the increase of ESR of the electronic component.

Referring to FIGS. 7A and 7B, the ESR value was high when the adhesive layer (epoxy ratio of 25, 50, 75, and 100%) including both the solder layer and the conductive resin layer was used, as compared to the adhesive layer including only the solder layer (epoxy ratio 0%).

Also, the ESR value appeared high as the ratio of the conductive resin layer increased between the adhesive layers (epoxy ratio of 25, 50, 75, and 100%) including both the solder layer and the conductive resin layer.

That is, when an adhesive layer including the conductive resin layer was used, an effect of improving warpage strength may be obtained, but ESR may also increase. Thus, it may be necessary to appropriately adjust the ratio of the solder layer and the conductive resin layer forming the adhesive layer.

In this case, a generally required ESR value of an MLCC in the related technical field to which the present disclosure belongs may be less than 10 mΩ. Therefore, as illustrated in FIG. 7A, when the vertical distance D between the mounting surfaces of the mounting portions 142 and 152 and the first surface 1 of the body 110 is 0.5 mm, and the ratio of the conductive resin layer is 75% or less, the ESR value of the electronic component may be 10 mΩ or less.

Similarly, as illustrated in FIG. 7B, it is indicated that, even when the vertical distance D between the mounting surfaces of the mounting portions 142 and 152 and the first surface 1 of the body 110 is 1 mm, and the ratio of the conductive resin layer is 75% or less, the ESR value of the electronic component may be around 10 mΩ.

In other words, when the vertical distance between one surface of the body 110 opposing one surface of the mounting portions 142 and 152 and the other surface of the mounting portions 142 and 152 is 0.5 mm or more and less than 1 mm, and the ratio of the conductive resin layer is adjusted to be 75% or less, the ESR value of MLCC may satisfy 10 mΩ or less.

Accordingly, in the electronic component 101 in an example embodiment, when the length of the solder layers 161 and 171 in the stacking direction (Z direction) of the internal electrodes 121 and 122 is defined as T1, and the length of the conductive resin layers 162 and 172 is defined as T2, T1 and T2 may satisfy $0.25 \leq T2/(T1+T2) \leq 0.75$.

As described above, by limiting the length ratio (volume ratio) of the solder layers 161 and 171 and the conductive resin layers 162 and 172 taken in the stacking direction, warpage strength of the electronic component 101 may improve to be greater than a generally required guaranteeing peak for warpage strength of an MLCC, and the ESR value may be maintained to be 10 mΩ or less.

Also, when the adhesive layer is formed by configuring the vertical distance (D) between the mounting surface of the mounting portion 142 and 152 and the first surface 1 of the body 110 as illustrated in FIG. 7A to be 0.5 mm, and configuring the conductive resin layer in a ratio of 25:75, the ESR measurement value similar to that of the example in which the vertical distance (D) between the mounting surface of the mounting portion 142 and 152 and the first surface 1 of the body 110 is 1 mm, and the adhesive layer without the conductive resin layer was formed may be obtained.

Thus, according to an example embodiment, by disposing both the solder layers 161 and 171 and conductive resin layers 162 and 172 between the external electrodes 131 and 132 and the metal frames 140 and 150, ESR of the electronic component 101 may be maintained to be low, and durability such as warpage strength may improve.

According to the aforementioned example embodiment, the mounting height of electronic components using the metal frame may be reduced such that ESR may be reduced, and the space occupied by the multilayer capacitor on the mounting board may be reduced.

Also, elasticity in the adhesive layer between the external electrode and the metal frame may increase such that external stress, such as vibrations, transmitted from the board to the multilayer capacitor may be reduced, and durability such as warpage strength may improve.

While the example embodiments have been illustrated and described above, it will be apparent to those skilled in the art that modifications and variations could be made without departing from the scope in the example embodiment as defined by the appended claims.

What is claimed is:

1. An electronic component, comprising:
    a multilayer capacitor including a body and an external electrode disposed externally on the body;
    a metal frame coupled to the multilayer capacitor; and
    an adhesive layer disposed between the external electrode and the metal frame and including a solder layer and a conductive resin layer.

2. The electronic component of claim 1,
    wherein the body includes a dielectric layer and internal electrodes stacked with the dielectric layer interposed therebetween, and
    wherein the metal frame includes a support portion coupled to the external electrode and extending in a stacking direction of the internal electrodes, and a mounting portion extending in a first direction from one end of the support portion such that one surface of the mounting portion is substantially in parallel with a first surface of the body.

3. The electronic component of claim 2, wherein the conductive resin layer is disposed to be more adjacent to the mounting portion than the solder layer.

4. The electronic component of claim 2, wherein, when a length of the solder layer in the stacking direction of the internal electrode is defined as T1, and a length of the conductive resin layer is defined as T2, T1 and T2 satisfy $0.25 \leq T2/(T1+T2)<1$.

5. The electronic component of claim 2, wherein the solder layer and the conductive resin layer are disposed to not overlap each other in the first direction.

6. The electronic component of claim 2, wherein the solder layer and the conductive resin layer have substantially the same length in the first direction.

7. The electronic component of claim 2, wherein the solder layer and the conductive resin layer have substantially the same width in a second direction perpendicular to the first direction and the stacking direction.

8. The electronic component of claim 2, wherein, when a length of the solder layer in the stacking direction of the internal electrodes is defined as T1, and a length of the conductive resin layer is defined as T2, T1 and T2 satisfy $0.25 \leq T2/(T1+T2) \leq 0.75$.

9. The electronic component of claim 8,
wherein the mounting portion and the external electrode are disposed to be spaced apart from each other, and
wherein a vertical distance between the first surface of the body opposing the one surface of the mounting portion and another surface of the mounting portion opposing the one surface of the mounting portion is more than or equal to 0.5 mm and less than 1 mm.

10. The electronic component of claim 1, wherein one end of the solder layer and one end of the conductive resin layer are coupled to each other.

11. The electronic component of claim 1, wherein the conductive resin layer includes a thermosetting resin.

12. The electronic component of claim 1, wherein the conductive resin layer includes at least one selected from among a conductive metal, a conductive polymer, and carbon.

13. An electronic component, comprising:
a multilayer capacitor including a body and first and second external electrodes disposed externally on the body and spaced apart from each other;
first and second metal frames coupled to the first and second external electrodes of the multilayer capacitor, respectively;
a first adhesive layer disposed between the first external electrode and the first metal frame and including a first solder layer and a first conductive resin layer; and
a second adhesive layer disposed between the second external electrode and the second metal frame and including a second solder layer and a second conductive resin layer.

14. An electronic component, comprising:
a multilayer capacitor including a body and an external electrode disposed externally on the body;
a metal frame coupled to the multilayer capacitor; and
an adhesive layer disposed between the external electrode and the metal frame and including a conductive resin layer,
wherein a length of the conductive resin layer is less than a length of the adhesive layer.

15. The electronic component of claim 14, wherein the body includes a dielectric layer and internal electrodes stacked with the dielectric layer interposed therebetween, and
wherein the metal frame includes a support portion coupled to the external electrode and extending in a stacking direction of the internal electrodes, and a mounting portion extending in a first direction from one end of the support portion such that one surface of the mounting portion is substantially in parallel with a first surface of the body.

16. The electronic component of claim 15, wherein the adhesive layer further includes a solder layer, and
the conductive resin layer is disposed to be more adjacent to the mounting portion than the solder layer.

17. The electronic component of claim 16, wherein, when a length of the solder layer in the stacking direction of the internal electrode is defined as T1, and a length of the conductive resin layer is defined as T2, T1 and T2 satisfy $0.25 \leq T2/(T1+T2) < 1$.

18. The electronic component of claim 16, wherein, when a length of the solder layer in the stacking direction of the internal electrodes is defined as T1, and a length of the conductive resin layer is defined as T2, T1 and T2 satisfy $0.25 \leq T2/(T1+T2) \leq 0.75$.

19. The electronic component of claim 16, wherein the solder layer and the conductive resin layer have substantially the same length in the first direction.

20. The electronic component of claim 14, wherein the conductive resin layer includes a thermosetting resin.

* * * * *